United States Patent
Farnsworth et al.

(10) Patent No.: US 9,467,917 B2
(45) Date of Patent: *Oct. 11, 2016

(54) METHOD AND SYSTEM FOR VOICE CALL SETUP FROM A PCH OR FACH STATE

(75) Inventors: Andrew John Farnsworth, Kidderminster (GB); Vaibhav Singh, Birmingham (GB); Muhammad Khaledul Islam, Ottawa (CA); Ozgur Ekici, Escondido, CA (US)

(73) Assignee: BlackBerry Limited, Waterloo (CA)

( * ) Notice: Subject to any disclaimer, the term of this patent is extended or adjusted under 35 U.S.C. 154(b) by 458 days.

This patent is subject to a terminal disclaimer.

(21) Appl. No.: 13/560,642

(22) Filed: Jul. 27, 2012

(65) Prior Publication Data

US 2013/0189992 A1    Jul. 25, 2013

Related U.S. Application Data

(60) Provisional application No. 61/513,383, filed on Jul. 29, 2011.

(51) Int. Cl.
*H04W 36/22* (2009.01)
*H04W 76/04* (2009.01)

(52) U.S. Cl.
CPC ........... *H04W 36/22* (2013.01); *H04W 76/046* (2013.01)

(58) Field of Classification Search
CPC ........................... H04W 36/22; H04W 76/046
USPC ...... 455/404.1, 418, 422.1, 435.1, 436, 437, 455/450, 452.1
See application file for complete search history.

(56) References Cited

U.S. PATENT DOCUMENTS

| | | | |
|---|---|---|---|
| 2006/0094478 A1 | 5/2006 | Kim et al. | |
| 2007/0060153 A1 | 3/2007 | Torsner et al. | |
| 2007/0135080 A1* | 6/2007 | Islam et al. | 455/343.1 |
| 2009/0124249 A1 | 5/2009 | Young et al. | |
| 2010/0135215 A1* | 6/2010 | Tang | H04W 72/0413 370/328 |
| 2011/0122783 A1* | 5/2011 | Lin et al. | 370/252 |

(Continued)

FOREIGN PATENT DOCUMENTS

| | | |
|---|---|---|
| WO | 2005079085 A1 | 8/2005 |
| WO | 2008076991 A2 | 6/2008 |
| WO | 2011091433 A2 | 7/2011 |

OTHER PUBLICATIONS

International Search Report on International Application No. PCT/CA2012/000704 mailed Nov. 8, 2012.

(Continued)

*Primary Examiner* — Dinh P Nguyen
(74) *Attorney, Agent, or Firm* — Moffat & Co.

(57) ABSTRACT

A method at a user equipment for establishing a circuit switched call, the user equipment being in a Cell Forward Access CHannel (CELL_FACH) state, a Cell Paging CHannel (CELL_PCH) state or a UTRAN Registration Area Paging CHannel (URA_PCH) state, the method receiving an indication that a circuit switched call is pending; sending to a network element a message to facilitate the user equipment to transition to a Cell Dedicated CHannel (CELL_DCH) state, the message being one of a cell update message having a traffic volume indicator information element indicating that pending uplink data exceeds a threshold or an RRCConnectionRequest message; and establishing the circuit switched call.

12 Claims, 13 Drawing Sheets

(56) References Cited

U.S. PATENT DOCUMENTS

2012/0026903 A1 2/2012 Song
2013/0189980 A1 7/2013 Ekici

OTHER PUBLICATIONS

International Preliminary Report on Patentability on International Application No. PCT/CA2012/000704 mailed Feb. 13, 2014.
3GPP TS 25.331 V6.25.0, Release 6 (Mar. 2010) Technical Specification Group Radio Access Network; Radio Resource Control (RRC); Protocol Specification, more particularly s.8.3.1.3.
Office Action, U.S. Appl. No. 13/560,668, mailed Mar. 31, 2014.
Office Action, U.S. Appl. No. 13/560,668, Mailed Jul. 10, 2014.
PCT application No. PCT/CA2012/000705, International Search Report and Written Opinion of the International Searching Authority, mailed Nov. 8, 2012.
3GPP TS 25.331 v 8.14.0, (Mar. 2011), Release 8 Technical Specification; 3rd Generation Partnership Project; Technical Specification Group Radio Access Network; Radio Resource Control (RRC); Protocol specification (Release 8), pp. 1-1735, Mar. 2011- 650 Route des Lucioles, Sophia Antipolis, Valbonne-France, more particularly pp. 210-211, section 8.3.1.3 and pp. 532-533, section 10.2.7-cell update.
3GPP TS 25.331 v 10.3.1, Release 10 Technical Specification; Universal Mobile Telecommunications System (UMTS); Radio Resource Control (RRC); Protocol specification, more particularly s. 8.1.8.2 (2011-04).
3GPP TS 25.331 v 10.3.1, Release 10 Technical Specification; Universal Mobile Telecommunications System (UMTS); Radio Resource Control (RRC); Protocol specification, more particularly s. 8.1.8.2 (May 2011).
3GPP TR 21.905 V10.3.0 Release 10 (Mar. 2011) Technical Report; Digital cellular telecommunications system (Phase 2-F); Universal Mobile Telecommunications System (UMTS); LTE; Vocabulary for 3GPP Specifications.
3GPP TS 25.331 v 7.19.0 Release 7 Technical Specification, Universal Mobile Telecommunications System (UMTS); Radio Resource Control (RRC); Protocol specification (May 2011).
3GPP TS 25.331 v 8.14.0, Release 8 Technical Specification; 3rd Generation Partnership Project; Technical Specification Group Radio Access Network; Radio Resource Control (RRC); Protocol specification (Release 8), more particularly s. 8.4.2.
3GPP TS 25.413 V3.11.1 Release 1999 (Sep. 2002) Universal Mobile Telecommunications System (UMTS); UTRAN lu interface RANAP signalling.
3GPP TS 25.413 V5.7.0 Release 5 (Dec. 2003) Universal Mobile Telecommunications System (UMTS); UTRAN lu interface Radio Access Network Application Part (RANAP) signalling.
3GPP TS 25.433 V3.11.0 (Sep. 2002) Universal Mobile Telecommunications System (UMTS); UTRAN lub interface NBAP signalling.
3GPP TS 25.433 V5.7.0 (Dec. 2003) Universal Mobile Telecommunications System (UMTS); UTRAN lub interface NBAP signalling.
3GPP TS 25.331 V9.6.0 (Mar. 2011) Technical Specification, 3rd Generation Partnership Project; Technical Specification Group Radio Access Network; Radio Resource Control (RRC); Protocol Specification (Mar. 2011).
3GPP TS 25.304 V10.0.0 (Mar. 2011) Technical Specification, 3rd Generation Partnership Project; Technical Specification Group Radio Access Network; User Equipment (UE) procedures in idle mode and procedures for cell reselection in connected mode (Release 10).
3GPP TS 25.304 V8.11.0 (Sep. 2010) Technical Specification, 3rd Generation Partnership Project; Technical Specification Group Radio Access Network; User Equipment (UE) procedures in idle mode and procedures for cell reselection in connected mode (Release 8).
3GPP TS 25.304 V7.8.0 (Sep. 2009)Technical Specification, 3rd Generation Partnership Project; Technical Specification Group Radio Access Network; User Equipment (UE) procedures in idle mode and procedures for cell reselection in connected mode (Release 7).
3GPP TS 25.304 V9.4.0 (Mar. 2011)Technical Specification, 3rd Generation Partnership Project; Technical Specification Group Radio Access Network; User Equipment (UE) procedures in idle mode and procedures for cell reselection in connected mode (Release 9).
European Patent Office, Extended European Search Report on Application No. 128203742 , Issued on Oct. 26, 2015.
USPTO, Non-Final Office Action on U.S. Appl. No. 13/560,668 , Issued on Jan. 11, 2016.
USPTO, Non-Final Office Action, U.S. Appl. No. 13/560,668, Feb. 3, 2015.
USPTO, Non-Final Office Action, U.S. Appl. No. 13/560,668, May 14, 2015.
Canadian Intellectual Property Office, Office Action on Application No. 2,843,404, Issued on Jul. 7, 2015.
USPTO Office Action on U.S. Appl. No. 13/560,668, issued May 18, 2016.
Canadian Intellectual Property Office, Office Action on Application No. 2,843,404, Issued on Jun. 17, 2016.

* cited by examiner

METHOD AND SYSTEM FOR VOICE CALL SETUP FROM A PCH OR FACH STATE

FIELD OF THE DISCLOSURE

The present disclosure relates to voice call setup and in particular relates to voice call setup when a Universal Mobile Telecommunications System (UMTS) user equipment (UE) is in a CELL_PCH, URA_PCH or CELL_FACH state.

BACKGROUND

In a Universal Mobile Telecommunication System (UMTS), a device with an established packet data protocol (PDP) context, such as an always-on device, may be transitioned by a network to a CELL_PCH or URA_PCH state after a voice call ends or due to data inactivity during a packet data session, rather than be transitioned to an IDLE mode. This transition process keeps the mobile device in connected mode without any radio resources assigned and provides for faster connection establishment and less network signaling for the subsequent call.

In a CELL_PCH or URA_PCH state the use equipment (UE) uses discontinuous reception (DRX) to monitor broadcast messages and pages via a paging indicator channel (PICH) and performs cell update or URA update as needed.

In various network communications, when a UE is in the CELL_PCH or URA_PCH state, or in some cases even when the device is in a CELL_FACH state, if a circuit switched voice call is received for the device or originates from the device, the network may not perform fast transition of the device to a CELL_DCH state. Instead, the network may initially move or keep the device in CELL_FACH state during exchange of signaling messages until a radio bearer is established. This results in call establishment being performed over a common, low-rate physical channel, leading to increased latency for call setup. Further, in the case where the UE is at a boundary area and the transition of the device from one cell to another is required, due to the fact that soft or softer handover is not possible in CELL_FACH state the call setup may fail in some situations.

BRIEF DESCRIPTION OF THE DRAWINGS

The present disclosure will be better understood with reference to the drawings in which.

DETAILED DESCRIPTION

The present disclosure provides a method at a user equipment for establishing a circuit switched call, the user equipment being in a Cell Forward Access CHannel (CELL_FACH) state, a Cell Paging CHannel (CELL_PCH) state or a UTRAN Registration Area Paging CHannel (URA_PCH) state, the method comprising: receiving an indication that a circuit switched call is pending; sending to a network element a message to facilitate transition to a Cell Dedicated CHannel (CELL_DCH) state, the message being a cell update message having a traffic volume indicator information element indicating that pending uplink data exceeds a threshold; and establishing the circuit switched call.

The present disclosure further provides a user equipment configured for establishing a circuit switched call, the user equipment being in a Cell Forward Access CHannel (CELL_FACH) state, a Cell Paging CHannel (CELL_PCH) state or a UTRAN Registration Area Paging CHannel (URA_PCH) state, the user equipment comprising: a processor; and a communications subsystem, wherein the processor and communications subsystem cooperate to: receive an indication that a circuit switched call is pending; and send to a network element a message to facilitate transition to a Cell Dedicated CHannel (CELL_DCH) state, the message being a cell update message having a traffic volume indicator information element indicating that pending uplink data exceeds a threshold; and establish the circuit switched call.

The present disclosure relates to UMTS and in particular to transitioning between various radio resource control (RRC) modes and states in UMTS. In particular, a user equipment (UE) can be in an idle mode or a connected (active) mode with a network. In the connected mode, the UE can be in one of four states, namely Cell_DCH, Cell_FACH, Cell_PCH and URA_PCH, as described below.

The transitioning between a connected mode and an idle mode is described below with reference to FIG. 1.

In particular, in a third generation (3G) network such as a UMTS network, a Radio Resource Control (RRC) part of the protocol stack is responsible for the assignment, configuration and release of radio resources between the UE and the Universal Terrestrial Radio Access Network (UTRAN). This RRC protocol is described in detail in the 3GPP TS 25.331 specifications. Two basic modes that the UE can be in are defined as "idle mode" and "UTRA connected mode". UTRA stands for UMTS Terrestrial Radio Access. In idle mode, the UE is required to request a RRC connection whenever it wants to send any user data or in response to a page whenever the UTRAN pages the UE for either Circuit Switch (CS) or Packet Switch (PS) connections. Idle and Connected mode behaviors are described in details in 3GPP specifications TS 25.304 and TS 25.331. The terms and definitions shown in this disclosure conform to those in TR 21.905.

Figure 13:
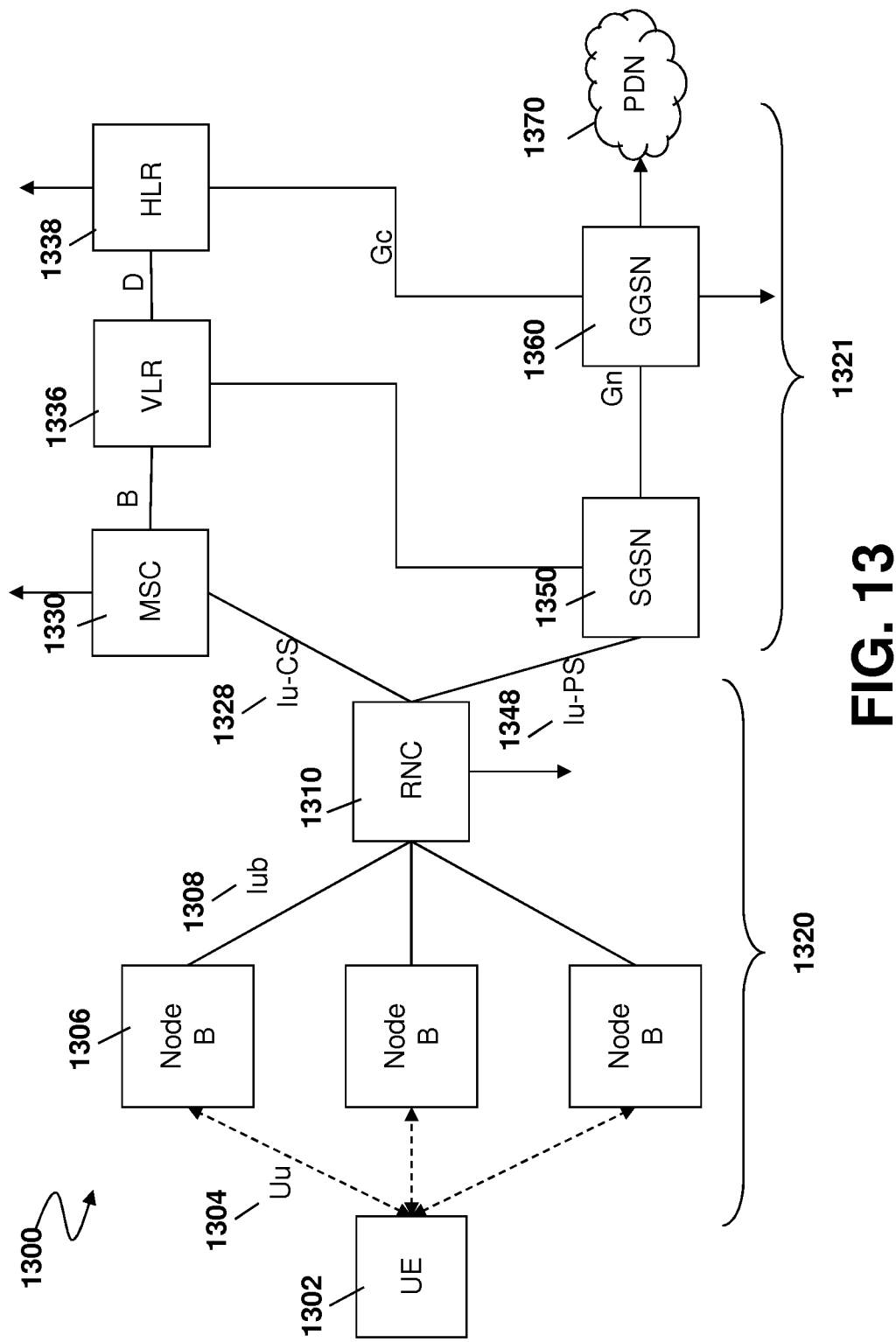
FIG. 13 is a block diagram showing exemplary network architecture.

As will be appreciated by those skilled in the art, a UMTS network consists of two land-based network segments. These are the Core Network (CN) and the Universal Terrestrial Radio-Access Network (UTRAN) (as illustrated in FIG. 13). The Core Network is responsible for the switching and routing of CS or PS calls and connections to the external networks while the UTRAN handles all radio related functionalities.

When in a UTRA RRC connected mode, the device can be in one of four states. These are:

CELL_DCH: A dedicated channel is allocated to the UE in uplink and downlink in this state to exchange data. The UE must perform actions as outlined in 3GPP TS 25.331.

CELL_FACH: no dedicated channel is allocated to the user equipment in this state. Instead, common channels are used to exchange a small amount of bursty data. The UE must perform actions as outlined in 3GPP TS 25.331 which includes the cell selection process as defined in 3GPP TS 25.304.

CELL_PCH: the UE uses Discontinuous Reception (DRX) to monitor broadcast messages and pages via a Paging Indicator Channel (PICH). UE is known at a cell level in this state. The UE must perform actions as outlined in 3GPP TS 25.331 which includes the cell selection process as defined in 3GPP TS 25.304. The UE must perform the CELL UPDATE procedure for each cell reselection procedure.

URA_PCH: the UE uses Discontinuous Reception (DRX) to monitor broadcast messages and pages via a Paging Indicator Channel (PICH). No uplink activity is possible. The UE must perform actions as outlined in 3GPP TS 25.331 including the cell selection process as defined in 3GPP TS 25.304. This state is similar to CELL_PCH, except that the UE is known at the UTRAN Registration Area (URA) level and is required to perform URA update procedure.

Figure 1:
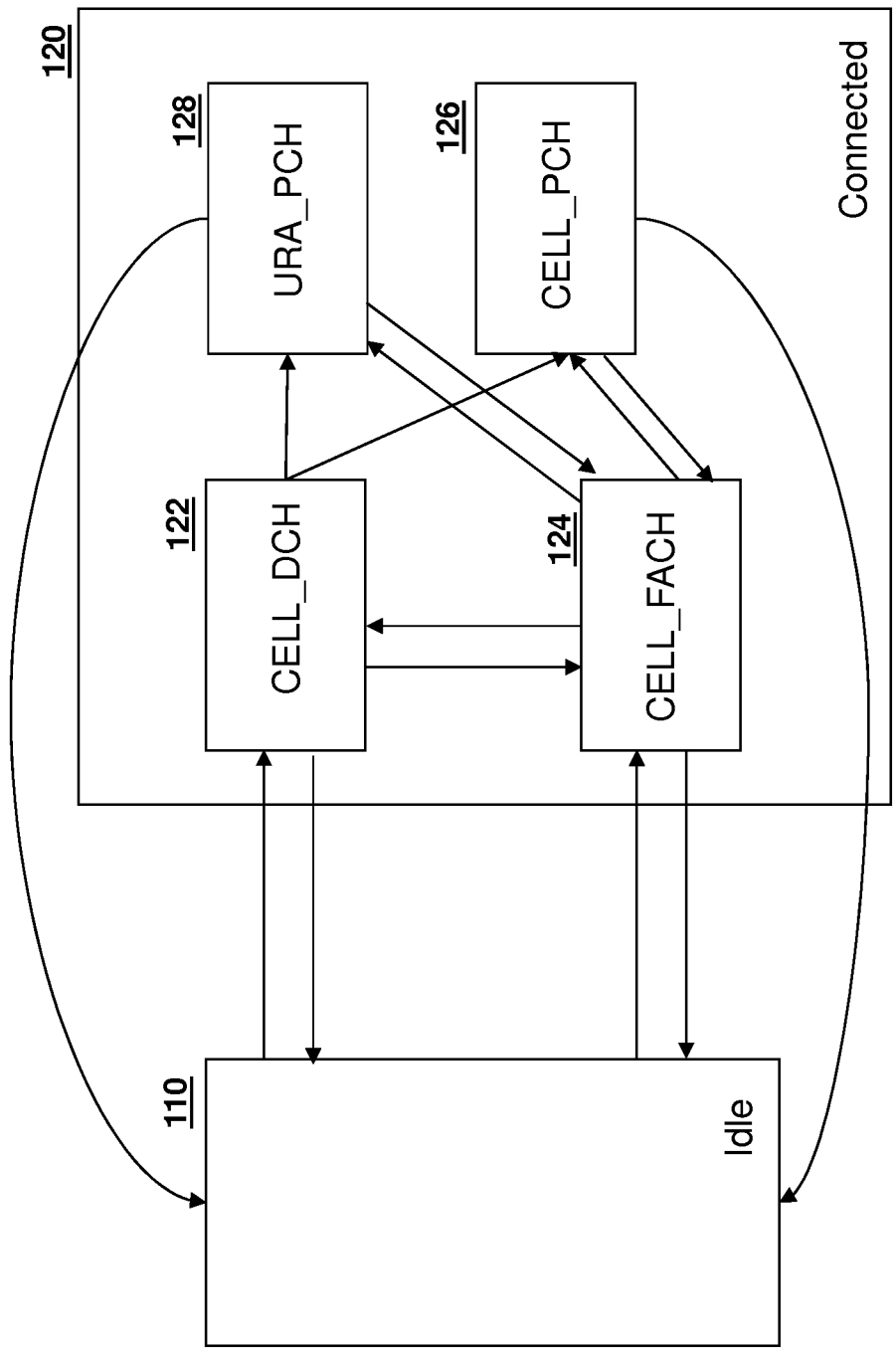
FIG. 1 is a block diagram showing the transitioning between various states and modes for a UE.

FIG. 1 is a block diagram showing the various modes and states for the radio resource control portion of a protocol stack on a UE. In particular, the RRC can be either in an RRC idle mode 110 or an RRC connected mode 120.

In idle mode 110, the UE requests an RRC connection to set up the radio resource whenever it needs to exchange information with the network. This can be as a result of either the UE initiating a connection, or as a result of the UE monitoring a paging channel to indicate whether the UTRAN has paged the UE for either CS or PS calls. In addition, UE also requests RRC connection whenever it needs to send Mobility Management signaling message such as Location Area Update.

Once the UE has sent a request to the UTRAN to establish a radio connection, the UTRAN chooses a state for the RRC connection to be in. Specifically, the RRC connected mode 120 includes four separate states. These are CELL_DCH state 122, CELL_FACH state 124, CELL_PCH state 126 and URA_PCH state 128.

From idle mode 110 the RRC connected mode 120 can either go to the Cell Dedicated Channel (CELL_DCH) state 122 or the Cell Forward Access Channel (CELL_FACH) state 124.

In CELL_DCH state 122, a dedicated channel is allocated to the UE for both uplink and downlink to exchange data. This state, since it has a dedicated physical channel allocated to the UE, typically provides faster exchange of data, lower latency along with a robust radio connection.

Alternatively, the UTRAN can move from idle mode 110 to a CELL_FACH state 124. In a CELL_FACH state 124 no dedicated channel is allocated to the UE. Instead, common channels are used to exchange signaling or a small amount of bursty user plane data.

Within the RRC connected mode 120, the RRC state can be changed at the discretion of the UTRAN. Specifically, if data inactivity is detected for a specific amount of time or data throughput below a certain threshold is detected, the UTRAN may move the RRC state from CELL_DCH state 122 to the CELL_FACH state 124, CELL_PCH state 126 or URA_PCH state 128. Similarly, if the payload is detected to be above a certain threshold then the RRC state can be moved from CELL_FACH 124 to CELL_DCH 122.

From CELL_FACH state 124, if data inactivity is detected for predetermined time in some networks, the UTRAN can command the UE to move the RRC state from CELL_FACH state 124 to a paging channel (PCH) state. This can be either the CELL_PCH state 126 or URA_PCH state 128.

From CELL_PCH state 126 or URA_PCH state 128 the UE must move to CELL_FACH state 124 in order to initiate any communication with the network.

CELL_PCH state 126 and URA_PCH state 128 use a discontinuous reception cycle (DRX) to monitor broadcast messages and pages by a Paging Indicator Channel (PICH). No uplink activity is possible.

The difference between CELL_PCH state 126 and URA_PCH state 128 from network perspective is that in URA_PCH state the UE is known to the network on UTRAN registration area level; whereas in CELL_PCH state the UE is known to the network on the cell level.

In a network that supports CELL_PCH or URA_PCH, an always-on UE is expected to move to the CELL_PCH or URA_PCH state under the order of the network after a voice call ends or due to data inactivity during a packet data session. Such network treatment mainly affects always on devices that maintains a packet data protocol (PDP) connection and also provide circuit switched (CS) services.

In wireless networks implementing CELL_PCH or URA_PCH features, traffic volume measurements are typically configured by the network to facilitate UE's fast transition to the radio resource rich CELL_DCH state for a packet data call. When the criteria specified in traffic volume measurement are met at the UE, the UE sends an event-triggered measurement report indicating that criteria are met. Another method that complements transmission of a separate message is inclusion of an indicator in the request to establish a packet data call from the CELL_PCH or URA_PCH state that implies that the traffic volume criteria have been met already.

However, since the traffic volume measurement or indicator is generally used for packet data calls, the establishment of a mobile originated or terminated circuit switched voice call is typically executed in the CELL_FACH state.

In the CELL_FACH state, the radio link between the network and an individual UE is not closed-loop power controlled and one of the key features of wideband code divisional multiple access (WCDMA) soft handover is not possible. This makes the connection more prone to hostile wireless channel conditions. Further, in the CELL_FACH state the radio resources only allow very low data rates, with 32 kilobits per second being the typical configuration on the downlink. Further, the CELL_FACH state is a shared resource and network traffic based on other uses could further increase connection latency. Such conditions are not ideal for circuit switched call establishment such as a voice call, which is considered to be a high priority and has a higher user experience impact than packet switched calls in terms of the latency and the success rate required for setting up a voice call.

TABLE 1

Call establishment time comparison

| | | MO CS Call | MT CS Call |
|---|---|---|---|
| Network 1 | Cell_PCH (DRX5) | 5.860 sec | 3.469 sec |
| | IDLE (DRX7) | 2.187 sec | 2.375 sec |
| Network 2 | Cell_PCH (DRX5) | 2.360 sec | 2.547 sec |
| | IDLE (DRX7) | 1.484 sec | 1.968 sec |
| Network 3 | Cell_PCH (DRX5) | | 2.672 sec |
| | IDLE (DRX7) | | 1.656 sec |

For example, reference is now made to Table 1. In Table 1 three networks are used to test the latency of a CS call setup. In each of the tests, the DRX cycle length coefficient in CELL_PCH and in the idle mode were set to 5 and 7 respectively by the network. As will be appreciated by those in the art having regard to the present disclosure, DRX cycle length coefficient 5 is a shorter DRX period and thus in theory should accelerate call setup procedure.

However, in each case, for both mobile originated (MO) and mobile terminated (MT) calls, the call setup was faster from the idle mode than from a CELL_PCH state, even with the shorter DRX period in the CELL_PCH state.

As can be seen from the first network, there is a 3.673 second difference for call setup time for mobile originated call establishment scenarios where the DRX configuration does not have any latency impact.

For mobile terminated call cases, the channel establishment from the idle mode is 1.094 second faster than from the CELL_PCH state in the first network.

Further, DRX5 configurations and CELL_PCH provides for an average of 480 milliseconds compared to DRX7 configurations in the IDLE mode. Taking this fact into account, in a similar DRX setting the performance difference for a mobile terminated circuit switched call may be approximately 1.5 seconds.

For the second network operator, similar results are seen. While the difference in the mobile originated and mobile terminated calls is slightly less on the second network, the connection from an idle mode is still faster than from a CELL_PCH state.

The significant latency performance difference between call establishments for an idle mode than from CELL_PCH is partly due to the very low data rate for physical channels that are available in the CELL_FACH state. In the above networks, the FACH transport channel data rate is 32 kilobits per second on the downlink and the random access channel (RACH) transport channel data rate is 16 kilobits per second on the uplink.

Further, delay in call establishment from CELL_PCH is high even with maximum data rates available for CELL_FACH. This is due, in part, to the fact that the same resources are used for control channels and traffic channels of users in the same cell.

As indicated above, the delay results from the network transitioning the device from a CELL_PCH state to a CELL_FACH state during call setup rather than transitioning directly to a CELL_DCH state.

Utilizing Traffic Measurement for Fast DCH Transition

If a network does not transition a device directly from CELL_PCH or URA_PCH to CELL_DCH on call setup, a UE can utilize traffic volume measurement methods in order to transition the UE to a CELL_DCH state more quickly.

This can be done using one of two volume indicators.

Traffic Volume Measurement Report

In accordance with the 3GPP TS 25.331 release 8 standard, "Universal Mobile Telecommunication System Radio Resource Control", version 8.14.0, Mar. 29, 2011, the contents of which are incorporated herein by reference, the UE may send a measurement report to the UTRAN in accordance with Section 8.4.2.

In particular, according to Section 8.4.2.2, if the UE is in a CELL_FACH state the UE shall transmit a measurement report message on the uplink DCCH when the reporting criteria stored in the variable measurement_identity are met for any outgoing traffic volume measurement.

Similarly, in CELL_PCH or URA_PCH, if the measurement reporting is not initiated then the UE may move to CELL_FACH before transmitting the measurement report. Conversely, if the measurement reporting is indicated a cell update message is transmitted with a cause "uplink data transmission" after which a measurement report is transmitted.

The measurement report may be sent, for example, if a traffic threshold has been reached which would cause the UE to transition to CELL_DCH quickly.

In accordance with one embodiment of the present disclosure, in order to transition quickly to CELL_DCH, the measurement report may be sent by the UE to the UTRAN for upon receiving an indication for a circuit switched call, even if the data threshold has not been met. Such indication may be a mobile originated or mobile terminated CS call.

The result of using the existing traffic volume measurement report allows for the UE to facilitate the transition into a CELL_DCH state to reduce the traffic latency for call setup for a circuit switched call and to increase the robustness of the radio connection for the circuit switched call.

Figure 2:
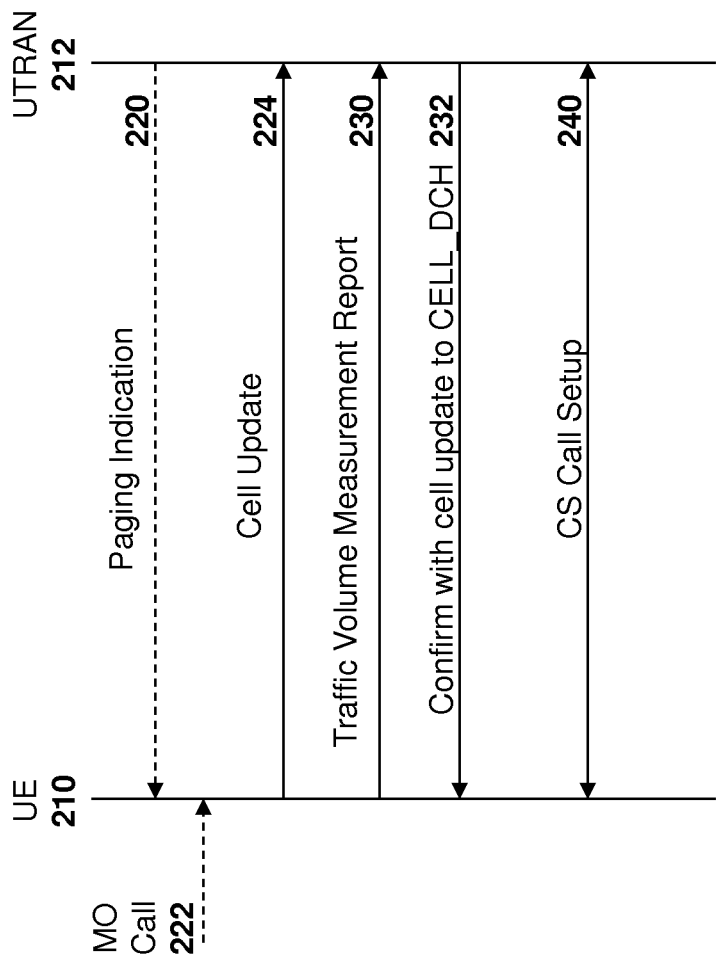
FIG. 2 is a dataflow diagram showing signaling of a traffic volume measurement report.

Reference is now made to FIG. 2, which shows call flow between a UE 210 and a UTRAN 212.

Once UE 210 that is in a CELL_PCH, URA_PCH or CELL_FACH state receives an indication that a call is pending for the device, it will transmit a cell update message first, as shown by arrow 224, to acknowledge the paging process. Later during the process, UE 210 can chose to send a traffic volume measurement report to the UTRAN, as described with regard to FIGS. 3 and 4 below. Specifically, the indication may be a page from the UTRAN indicating a circuit switched call is waiting for the UE (a mobile terminated call), as illustrated by arrow 220, or may be a user initiated circuit switched call on the UE (mobile originated call), as shown by arrow 222.

If the UE decides that a transition to CELL_DCH may not be network initiated, the UE sends a traffic volume measurement report indicating that the traffic volume exceeds a preconfigured threshold. Such report is shown by arrow 230 in FIG. 2.

Responsive to the receipt of the traffic volume measurement report, UTRAN 212 sends a confirmation with a cell update to CELL_DCH, as shown by arrow 232.

Once the UE 210 has transitioned to CELL_DCH circuit switched call set up occurs as normal. This is shown by arrow 240 in FIG. 2.

From the UE perspective, the method performed is described with reference to FIG. 3. The process of FIG. 3 starts at block 310. A precondition for the process is that the UE is in a CELL_PCH, URA_PCH or CELL_FACH state.

The process then proceeds to block 312 in which a check is made to determine whether a circuit switched call indication has been received by the UE. The check of block 312 may be for a mobile originated call or may be based on a paging channel indication indicating a mobile terminated call is waiting for the device.

From block 312, if there is no circuit switched call indication the process proceeds to loop back to block 312 until a circuit switched call indication is received.

Once a circuit switched call indication is received at block 312 the process proceeds to block 320 in which a traffic volume measurement report is sent from the UE to the UTRAN.

From block 320, the UTRAN transitions the UE to CELL_DCH state based on the traffic volume measurement report as shown by line 330 and the process proceeds from block 320 to block 340 in which the call is established. As will be appreciated by those in the art, the establishment of a call involves various communications between the UE and the UTRAN to establish the dedicated circuit switched connection.

From block 340 the process proceeds to block 350 and ends.

Figure 4:
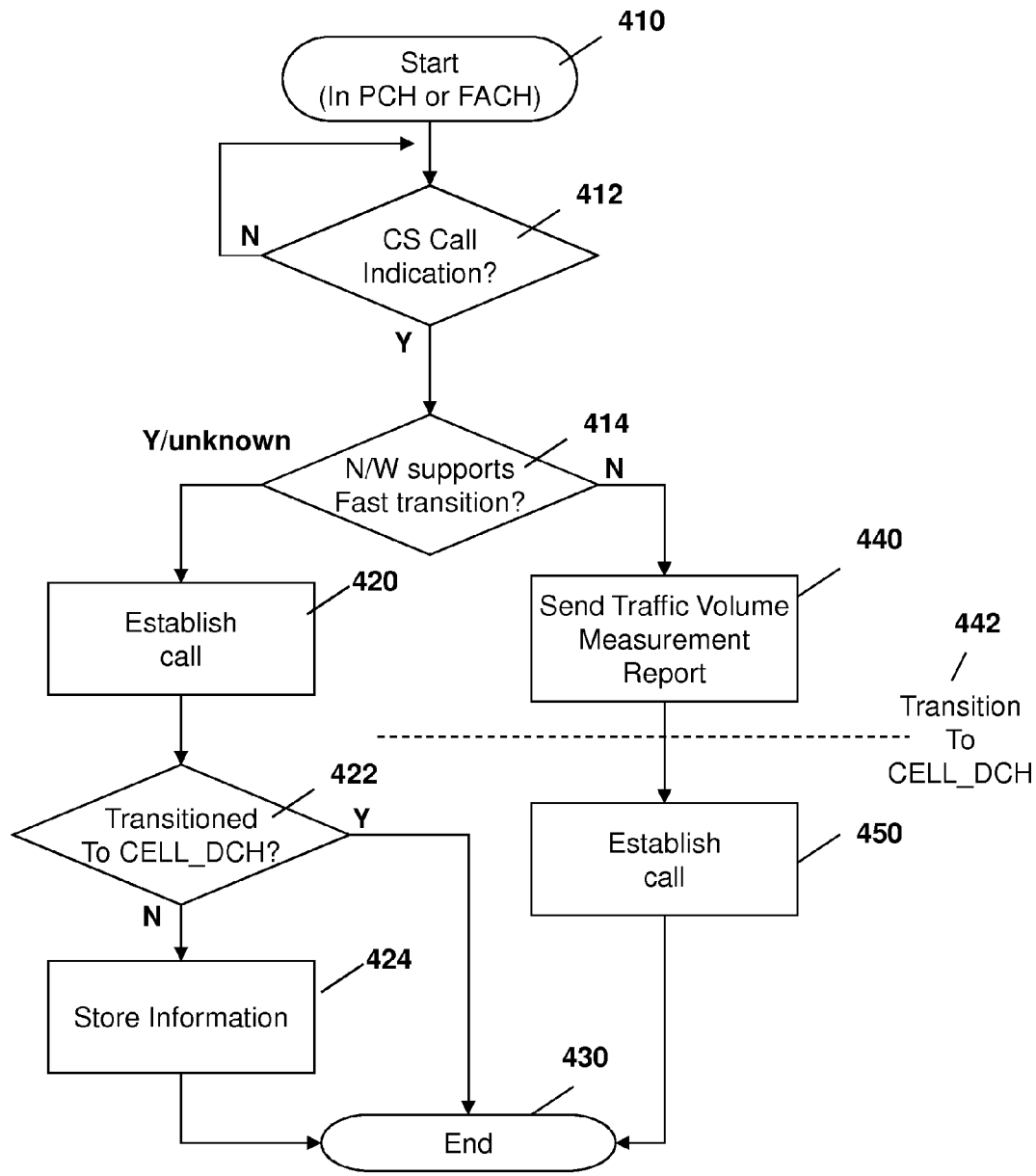
FIG. 4 is a process diagram showing an exemplary process at a UE for fast transitioning to CELL_DCH after determining network capabilities.

In an alternative embodiment, the network may implement a fast transition to a CELL_DCH state in certain circumstances and thus a traffic volume measurement report may not be needed. Reference is now made to FIG. 4.

The process of FIG. 4 starts at block 410 and proceeds to block 412 in which a check is made to determine whether a CS call indication has been received. As with the embodiment of FIG. 3, the indication may be a mobile terminated or mobile originated call.

If no indication is received, the process of FIG. 4 loops at block 412. Once an indication is received, the process proceeds from block 412 to block 414.

At block 414, the process checks whether the network supports a fast transitions to CELL_DCH. From block 412, if the network supports the fast transition or if the UE does not know whether the network supports the fast transition, the process proceeds to block 420 in which a call establishment is attempted.

After block 420, the mobile can check whether the network supports fast transition, as shown by block 422. Such a check might involve finding whether the cell update procedure causes the UTRAN transition the UE from CELL_FACH to CELL_DCH state. A fast transition would be to CELL_DCH. If no fast transition is supported, the process proceeds to block 424 in which the mobile stores the information that the network does not support the fast transition for future call setups. The storage of such information may, in some embodiments, be only valid until the radio of the UE is off or until the UE transitions to a new network, after which the memory may be cleared. Thus on radio on or transition to a network, the UE may assume that fast transition is supported until after the CS call attempt. Alternatively, in other embodiments a learning phase may involve multiple CS call attempts to determine whether the network supports fast transitioning. A network may, for example, transition to CELL_DCH only in good radio conditions, and thus a learning phase may require multiple CS call attempts to determine whether the network supports a fast transition to CELL_DCH.

From block 422 or block 424 the process proceeds to block 430 and ends.

Conversely, if the UE knows that the network does not support fast transition, the process proceeds from block 412 to block 440 in which a traffic volume measurement report is sent to the network. This leads to the UE being transitioned to CELL_DCH, as shown by line 442.

The process then proceeds to block 450 in which a call is established according to normal procedures and the process then proceeds to end at block 430.

In some networks, an initial direct transfer report can preempt a traffic volume measurement report, and thus cause the call to be setup in CELL_FACH even through the traffic volume measurement report was sent. Specifically, a UE has a plurality of signaling radio bearers (SRB), each of which has specific purposes. In one embodiment the traffic volume measurement report is signaled on SRB2.

An initial direct transfer message (IDT) is a message sent from the UE to the UTRAN. It is typically signaled on SRB3 and results in a security mode command being returned from the UTRAN to the UE. The security mode command procedure is part of the circuit switched call establishment and requires multiple steps to complete the procedure. If the UE is still in a CELL_FACH state then the problems identified above, namely high latency and possible call set up failure, may occur.

The priority of the signaling radio bearers is set by the network. Some networks implement all SRBs with the same priority level. In other networks the priority for SRB1 is the highest, SRB2 is the second highest and SRB3 is the third highest.

If the priority for SRB2 is higher than that of SRB3, the traffic volume measurement report will have a higher priority and will ensure that the UE is transitions to CELL_DCH prior to call set up. However if the priority for the SRBs is equal, the IDT may overtake the traffic volume measurement report and thus cause the call set up to occur in CELL_FACH. To avoid this unwanted behaviour a UE may implement the method illustrated by FIG. 5.

Figure 5:
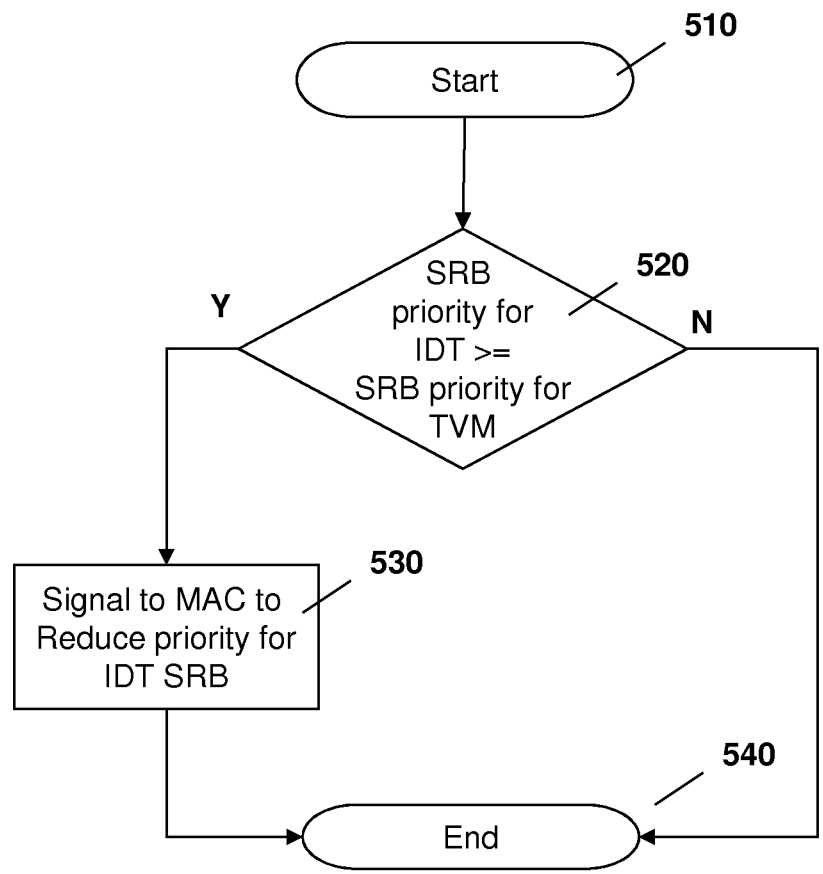
FIG. 5 is a process diagram for prioritizing a signaling radio bearer for a traffic volume measurement report.

In FIG. 5 the process starts at block 510 and proceeds to block 520. In block 520 a check is made to determine whether the priority for the SRB for the IDT is greater than or equal to the priority for the SRB for the traffic volume measurement. If yes, the process proceeds to block 530. Conversely, if the result of the check at block 520 is no the process proceeds to block 540 and ends.

In block 530 the UE RRC layer sends a command to the MAC layer to lower the priority for the SRB of the IDT. Such commands to change the priority of an SRB would be known to those in the art. Based on the command, the MAC layer reduces the priority of the SRB for the IDT to a lower level than the priority for the traffic volume measurement report, thus ensuring that the UE transitions to CELL_DCH prior to call set up.

Figure 3:
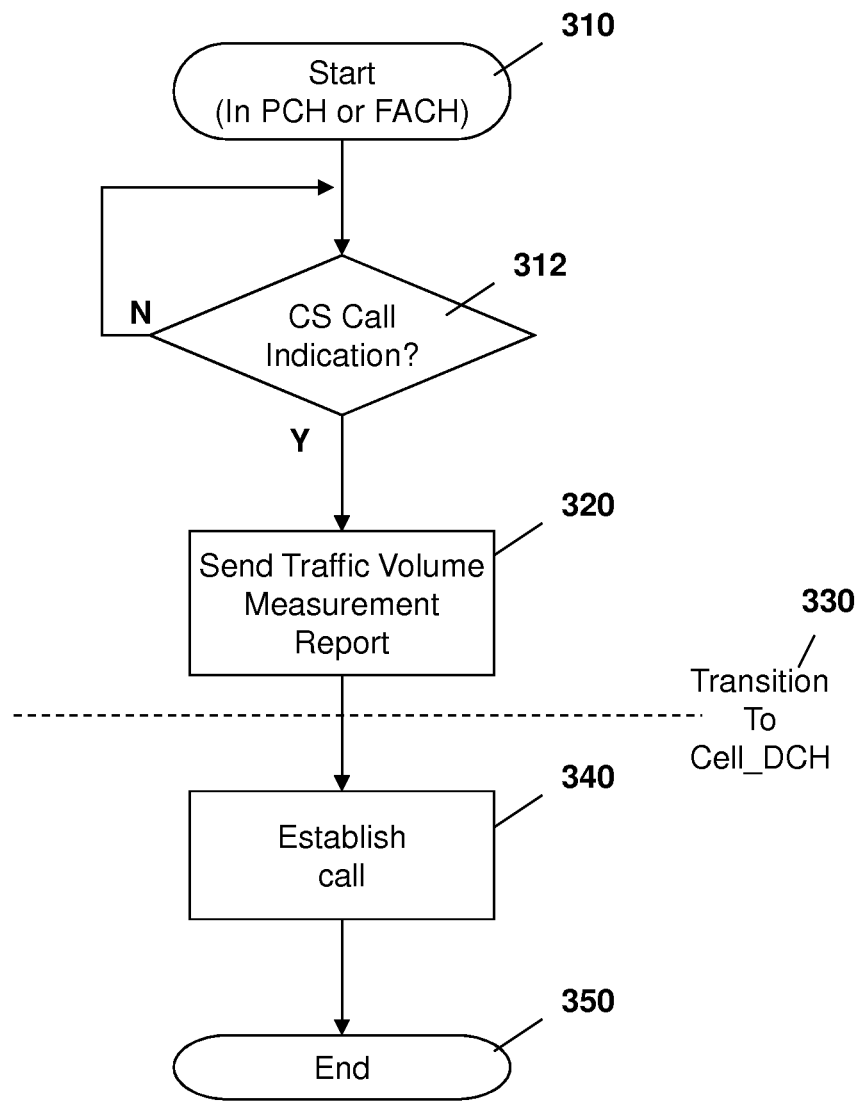
FIG. 3 is a process diagram showing an exemplary process at a UE for fast transitioning to CELL_DCH.

The process of FIG. 5 may, for example, be performed prior to blocks 320 and 440 in FIGS. 3 and 4 above.

Alternatives to ensuring the IDT is not sent before the traffic volume measurement report include sending the traffic volume measurement report on SRB1.

Further alternatives include delaying queuing the IDT until an event has occurred. Such events include, but are not limited to, delaying queuing for a predetermined duration, delaying queuing until a layer 2 ACK is received for the traffic volume measurement, delaying queuing until the traffic volume measurement report has been selected to be sent, or delaying queuing until the traffic volume measurement report has been sent.

Traffic Volume Indicator in Cell Update Message

In an alternative embodiment, instead of using a traffic volume measurement report, a traffic volume indicator information element (IE) in a cell update, is defined in Section 8.3.1.3 of the 3GPP TS25.331 may be utilized by a UE for signalling to the UTRAN.

In particular, the UE may use the traffic volume indicator to indicate that a threshold for data volume has been exceeded. In this procedure, the UE includes this traffic volume indication in cell update message rather than sending a separate measurement report with traffic volume measurement. Such process is expected to accelerate the CELL_DCH transition process. In this embodiment, UE may initiate a fast transition to a CELL_DCH state by using this traffic volume indicator for a pending circuit switched call. Thus, the UE can set the IE to be true (indicating to the network that data traffic volume threshold is increased) despite the fact that the nature of the call is circuit switched.

As will be appreciated by those in the art having regard to the present disclosure, in some embodiments, the traffic volume indicator feature may not be implemented by a network in which case the UE may use a traffic volume measurement report as provided above.

Figure 6:
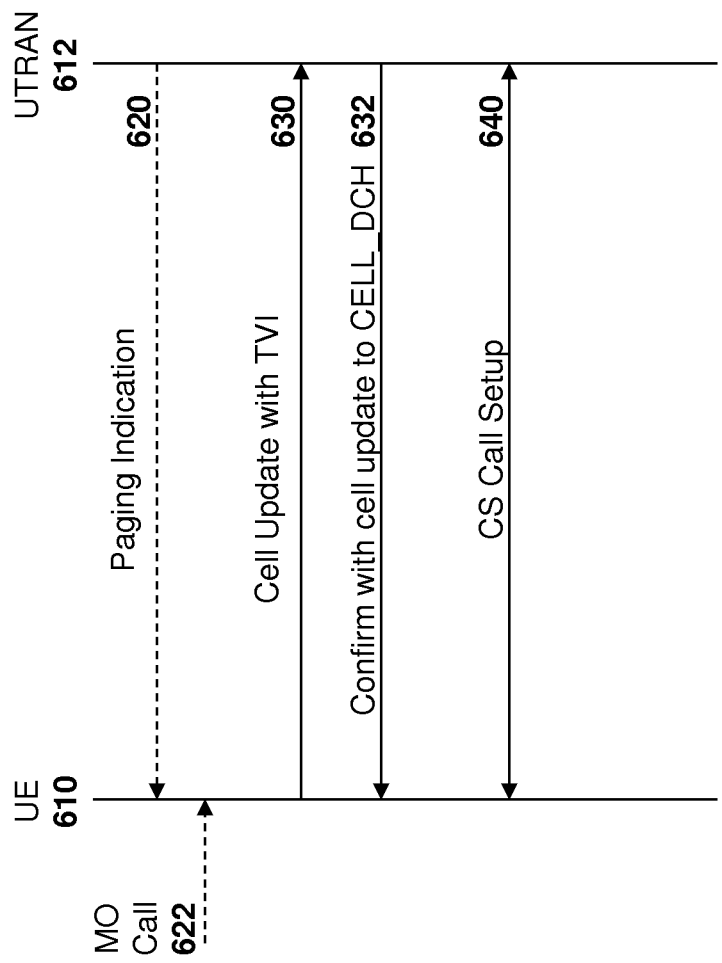
FIG. 6 is a dataflow diagram showing signaling of a cell update with a traffic volume indicator.

Reference is now made to FIG. 6, which shows signaling between UE 610 UTRAN 612. In the embodiment of FIG. 6, UE 610 receives an indication that a circuit switched call is pending. This may be a paging indication from the UTRAN for a mobile terminated call, as shown by arrow 620. Alternatively, this may be a mobile originated call, as shown by arrow 622.

In response to the indication, UE 610 sends a cell update with a traffic volume indicator information element to UTRAN 612, as shown by arrow 630. The UTRAN 612 sends a confirmation message with a cell update confirm, transitioning the UE to CELL_DCH state, as shown by arrow 632.

The circuit switched call setup then proceeds as normal, as shown by arrow 640.

Figure 7:
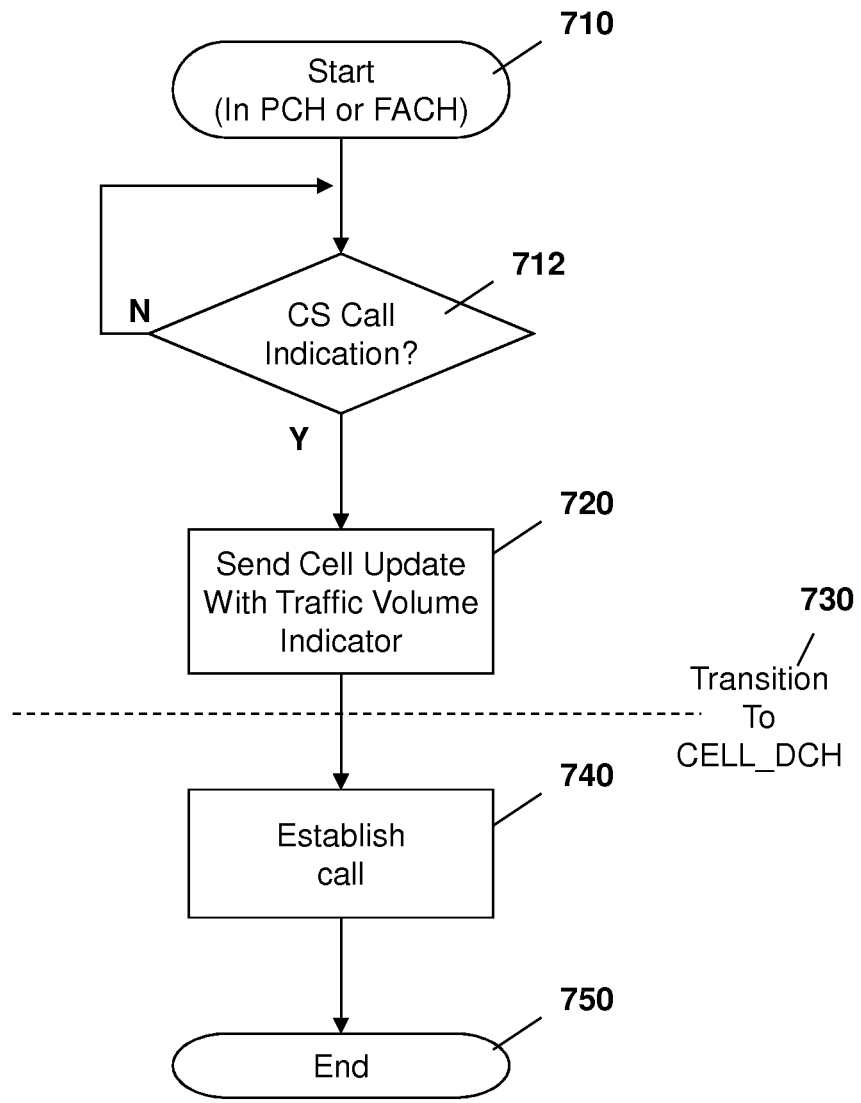
FIG. 7 is a process diagram showing an alternative embodiment at a UE for fast transitioning to CELL_DCH.

From the UE perspective, reference is now made to FIG. 7. In FIG. 7 the process starts at block 710 in which a pre-condition is that the UE is in a CELL_PCH, URA_PCH or CELL_FACH state. The process proceeds to block 712 in which a check is made to determine whether a circuit switched call indication is pending. This may be a mobile terminated or a mobile originated call. If not, the process proceeds to loop back to block 712.

Once the circuit switched call indication has been received, the process proceeds to block 720 in which a cell update message is sent in which the traffic volume indicator IE is set to true.

The sending of the message at block 720 causes the UE to transition to a CELL_DCH, as shown by arrow 730.

The process then proceeds to block 740 in which the establishment of the call is negotiated between the UE and the UTRAN over the CELL_DCH channel.

The process then proceeds to block 750 and ends.

The above therefore transitions to a CELL_DCH state in order to reduce latency for circuit switched call setup.

In a further embodiment, a check may be made to determine whether the network supports a fast transition of the UE to CELL_DCH prior to sending the cell update message with the traffic volume indicator IE.

Figure 8:
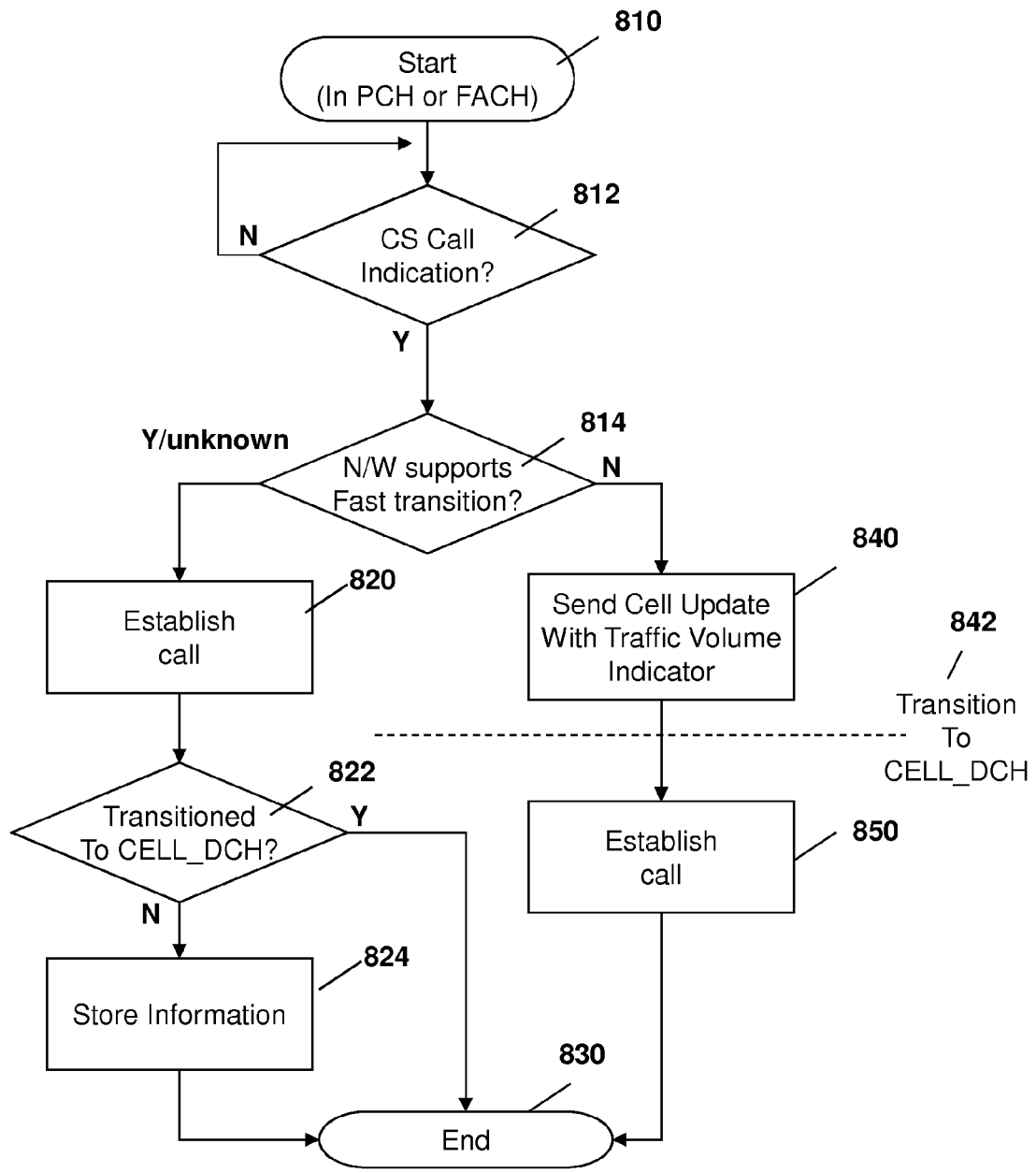
FIG. 8 is a process diagram showing an alternative embodiment at a UE for fast transitioning after determining network capabilities.

Reference is now made to FIG. 8. The process of FIG. 8 starts at block 810 and proceeds to block 812 in which a check is made to determine whether a circuit switched call indication has been received. If not, the process proceeds back to block 812 and continues to loop until a circuit switched call indicator has been received.

From block 812, if a circuit switched call indication has been received the process proceeds to block 814 in which a check is made to determine whether the network supports a fast transition.

If the network supports the transition or if it is unknown whether the network supports fast transition, the process proceeds to block 820 to establish the call.

The process then proceeds to block 822 in which a check is made to determine whether the call was established using CELL_FACH or CELL_DCH. If the call was established using CELL_DCH the process proceeds to block 830 and ends.

Conversely, if the call was made using CELL_FACH, then the process proceeds to block 824 in which the information about the network is stored for future determinations at block 814. This again may be performed after a single or multiple CS call attempts.

The process then proceeds to block 830 and ends.

From block 814, if the network does not support fast transition the process proceeds to block 840 and sends a cell update message with a traffic volume indicator IE set to true.

The sending of the message at block 840 causes a transition to CELL_DCH, as shown by block 842.

The process then proceeds to block 850 and establishes the call and then proceeds to block 830 and ends.

From the network perspective, if the UTRAN receives a cell update message with a traffic volume indicator set to true, or of the network receives a measurement report indicating a traffic volume measurement about a threshold, then the network may transition the UE to a CELL_DCH state. While such transition is not specified in the 3GPP standards, networks typically will transition the UE to CELL_DCH unless the network is facing radio resource issues. Subsequently, communication between the UE and the UTRAN is done over a dedicated channel based on CELL_DCH, which then can be used for establishment of the circuit switched call.

RRC Connection Request

In a further embodiment, the UE may drop existing radio resource connections to the UTRAN in order to transition into a CELL_DCH state for new radio resource connections more quickly. In particular, when the UE is in a CELL_FACH or CELL_PCH or URA_PCH state, rather than sending a cell update from the CELL_PCH or an initial direct transfer from the CELL_FACH to initiate a voice call, an RRCConnectionRequest is sent.

Specifically, when a UE is in CELL_PCH it should use the cell update message to communicate with the UTRAN. However, the 3GPP Technical Specifications indicate that de-synchronization may occur between the UE and UTRAN. This may occur, for example, when a UE goes out of range for the UTRAN and communicates with the same public land mobile network (PLMN). The communication with the PLMN may indicate that there has been a synchronization problem and may cause the release of all RRC connections and proceed to idle mode.

In accordance with the present disclosure, the UE may, even though not desynchronized, send an RRCConnectionRequest to the UTRAN. The UTRAN will establish CELL_DCH radio bearers based on the RRCConnectionRequest and will realize that the UE has become de-synchronized with the UTRAN and thus will release all the CELL_PCH resources.

If the RRCConnectionRequest indicates that there is a circuit switched call then the network will initiate the RRC connection setup into the CELL_DCH state which will result in faster connection to CELL_DCH and therefore enable the circuit switched call to be set up more quickly.

Figure 9:
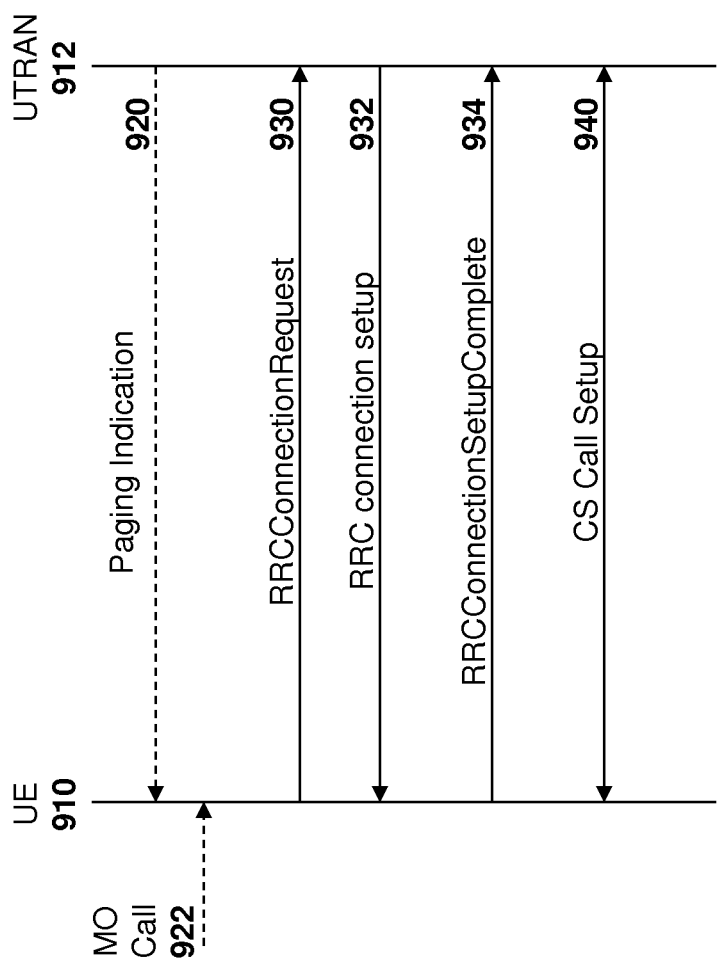
FIG. 9 is a dataflow diagram showing signaling of a call establishment from IDLE mode with a RrcConnectionRequest message.

The above signaling is shown with regard to FIG. 9. In particular, UE 910 communicates with UTRAN 912. UE 910 receives an indication that a call is pending. This could be either a paging indication from UTRAN 912 for a mobile terminated call, as shown by arrow 920, or a mobile originated call, as shown by arrow 922.

Once UE 910 receives the indication, the UE sends an RRCConnectionRequest to UTRAN 912, as show by arrow 930. This message is typically sent when the UE is in IDLE mode but if UTRAN 912 receives the message while the UE is in a connected mode then it will tear down the existing RRC connection for the UE and send an RRC connection setup message as shown by arrow 932.

Because the RRCConnectionRequest indicated a circuit switched call was pending, the RRC connection setup will establish the UE in CELL_DCH.

Subsequently, an RRCConnectionSetupComplete message is sent from UE 910 to UTRAN 912, as shown by arrow 934.

Circuit switched call setup will then proceed as normal, as shown by arrow 940.

Figure 10:
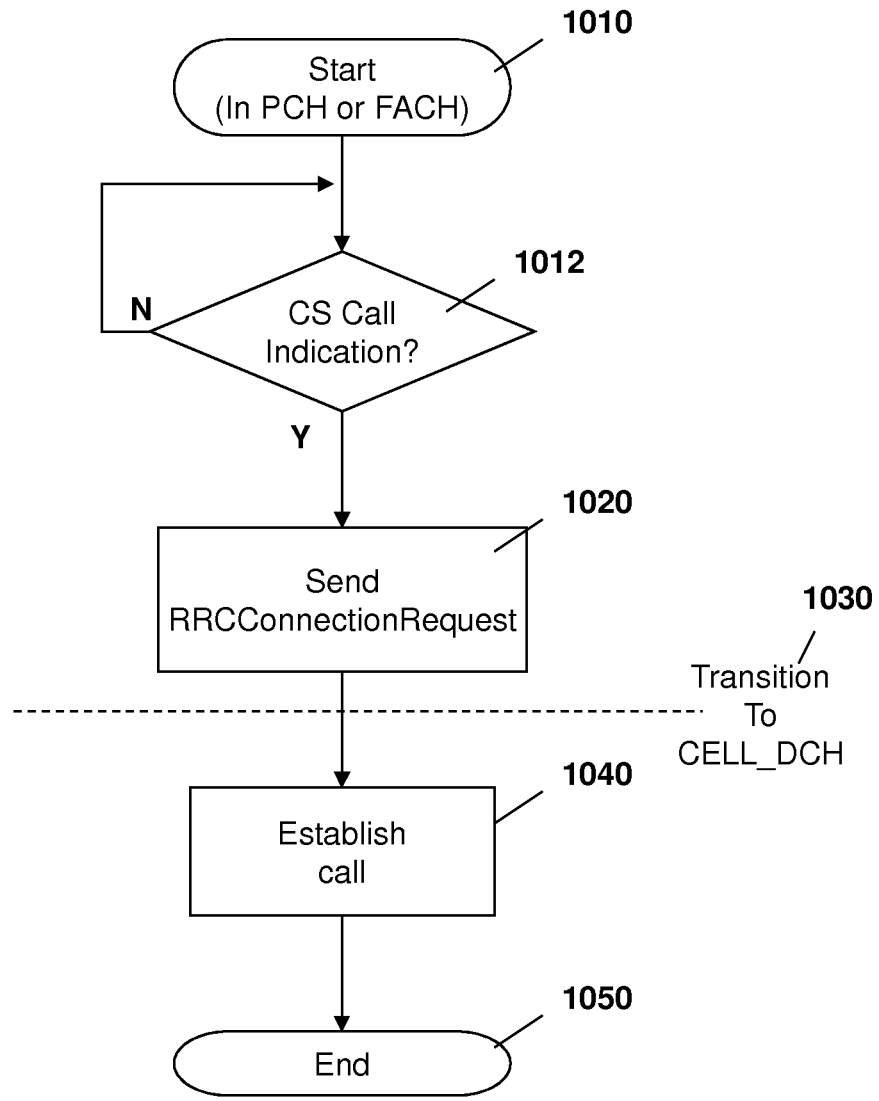
FIG. 10 is a process diagram showing an alternative embodiment at a UE for fast transitioning to CELL_DCH.

Reference is now made to FIG. 10. In FIG. 10, the process starts at block 1010 in which the preconditions are that a CELL_PCH, URA_PCH or CELL_FACH state are implemented on the UE.

The process then proceeds to block 1012 in which a check is made to determine whether a circuit switched call indication has been received. If not, the process proceeds to loop to block 1012 until a circuit switched call indication is received. Again the circuit switched call indication may be an attempt to initiate the call on the UE in which case a mobile originated call is being performed. Also, the call indication may be an indication on a paging channel from the network to indicate that there is a mobile terminated call in progress.

From block 1012, the process proceeds to block 1020 in which RRCConnectionRequest is sent from the UE to the network. The indication in the RRCConnectionRequest is that there is a circuit switched call waiting which causes the network to teardown the existing RRC connection and establish new RRC connection in the CELL_DCH state. The transition to the CELL_DCH state is shown, for example, by arrow 1030.

The process then proceeds to block 1040 in which the call is established over the CELL_DCH and then to block 1050 in which the process ends.

As with the embodiments above, the UE can check to determine whether or not the network supports transitioning quickly from a CELL_PCH or CELL_FACH state to a CELL_DCH state for circuit switched call set up. If yes, the process is unnecessary. However if no the process then will proceed to send the RRCConnectionRequest with a circuit switched call indication.

Figure 11:
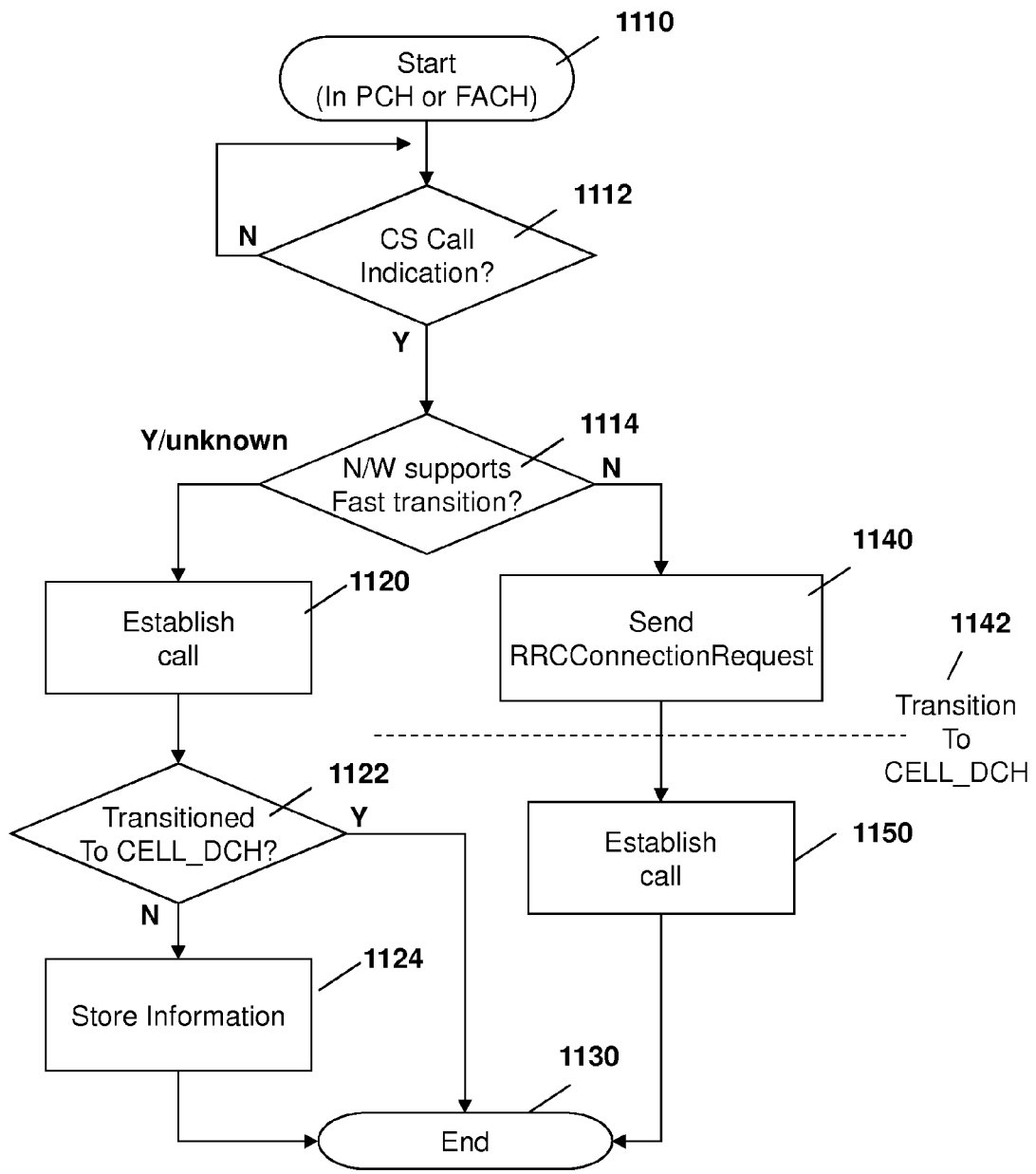
FIG. 11 is a process diagram showing an alternative embodiment at a UE for fast transitioning after determining network capabilities.

Specifically, reference is now made to FIG. 11. The process of FIG. 11 starts at block 1110 and proceeds to block 1112 in which a check is made to determine whether a circuit switched call indication has been received. If not, the process proceeds to loop at block 1112 until a circuit switched call is received.

The process then proceeds to block 1114 in which a check is made to determine whether the network supports a fast transition. If yes, or if unknown by the UE, the process proceeds to block 1120 to establish the call.

After block 1120 the process proceeds to block 1122 to determine whether the call establishment was done using CELL_FACH or CELL_DCH. If the call establishment was performed using CELL_FACH, the process proceeds to block 1124 in which information is stored that the network does not support fast transitions and the process proceeds to block 1130 and ends. A learning phase may also be used in some embodiments to determine whether or not the network supports fast transitioning over multiple CS call attempts.

Conversely, from block 1122 if the call establishment was performed in CELL_DCH then the network supports the fast transition and the process proceeds directly from block 1122 to block 1130 and ends.

If, during the check at block 1114, it is determined that the network does not support fast transition then the process proceeds to block 1140 in which an RRCConnectionRequest is send from the UE to the UTRAN indicating a circuit switched call is pending.

Based on the receipt of the message at block 1140, the network will tear down the existing RRC connection and establish a new RRC connection for CELL_DCH. This is shown by block 1142.

The process then proceeds to block 1150 in which the call is established using the CELL_DCH and the process then proceeds to block 1130 and ends.

Practical tests have shown that the transition to CELL_DCH for circuit switched call establishment can save approximately 1.5 seconds over a similar call establishment using CELL_FACH.

Based on the above, the latency required for call setup can be reduced by causing the UE to transition to a CELL-DCH state more quickly.

Three proposals are described above including the use of a traffic measurement indicator in a cell update, a traffic volume measurement report, or an RRC connection establishment request when the device is in CELL_PCH, URA_PCH or CELL_FACH.

Figure 12:
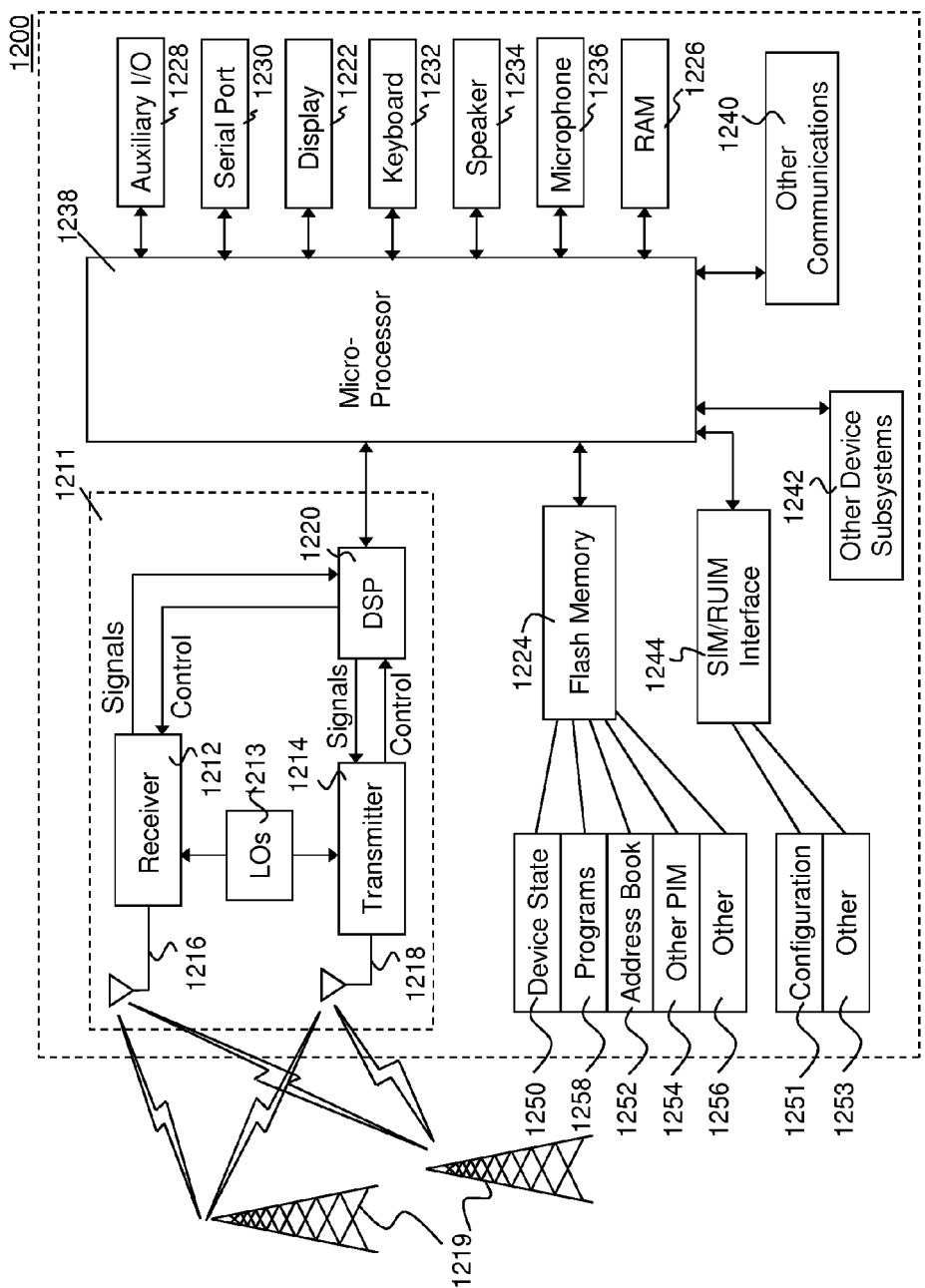
FIG. 12 is a block diagram showing an exemplary UE capable of being used with the present disclosure.

While the above can be implemented on a variety of UEs, an example of one UE is outlined below with respect to FIG. 12. Reference is now made to FIG. 12.

UE 1200 is generally a two-way wireless communication device having at least voice and data communication capabilities. UE 1200 may have the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where UE 1200 is enabled for two-way communication, it can incorporate a communication subsystem 1211, including both a receiver 1212 and a transmitter 1214, as well as associated components such as one or more, embedded or internal, antenna elements 1216 and 1218, local oscillators (LOs) 1213, and a processing module such as a digital signal processor (DSP) 1220. As will be apparent to those skilled in the field of communications, the particular design of the communication subsystem 1211 will be dependent upon the communication network in which the device is intended to operate. For example, UE 1200 may include a communication subsystem 1211 designed to operate within the GPRS network or UMTS network.

Network access requirements will also vary depending upon the type of network 1219. For example, In UMTS and GPRS networks, network access is associated with a subscriber or user of UE 1200. For example, a GPRS UE therefore requires a subscriber identity module (SIM) card in order to operate on a GPRS network. In UMTS a USIM or SIM module is required. In CDMA a RUIM card or module is required. These will be referred to as a UIM interface herein. Without a valid UIM interface, a UE may not be fully functional. Local or non-network communication functions, as well as legally required functions (if any) such as the ability to make emergency calls, may be available, but UE 1200 will be unable to carry out any other functions involving communications over the network 1219. The UIM interface 1244 is normally similar to a card-slot into which a card can be inserted and ejected like a diskette or PCMCIA card. The UIM card can hold many key configuration 1251, and other information 1253 such as identification, and subscriber related information.

When required network registration or activation procedures have been completed, UE 1200 may send and receive communication signals over the network 1219. Signals received by antenna 1216 through communication network 1219 are input to receiver 1212, which may perform such common receiver functions as signal amplification, frequency down conversion, filtering, channel selection and the like, and in the example system shown in FIG. 12, analog to digital (A/D) conversion. A/D conversion of a received signal allows more complex communication functions such as demodulation and decoding to be performed in the DSP 1220. In a similar manner, signals to be transmitted are processed, including modulation and encoding for example, by DSP 1220 and input to transmitter 1214 for digital to analog conversion, frequency up conversion, filtering, amplification and transmission over the communication network 1219 via antenna 1218. DSP 1220 not only processes communication signals, but also provides for receiver and transmitter control. For example, the gains applied to communication signals in receiver 1212 and transmitter 1214 may be adaptively controlled through automatic gain control algorithms implemented in DSP 1220.

Network 1219 may further communicate with multiple systems, including a server and other elements (not shown). For example, network 1219 may communicate with both an enterprise system and a web client system in order to accommodate various clients with various service levels.

UE 1200 can include a microprocessor 1238 which controls the overall operation of the device. Communication functions, including data communications, are performed through communication subsystem 1211. Microprocessor 1238 also interacts with further device subsystems such as the display 1222, flash memory 1224, random access memory (RAM) 1226, auxiliary input/output (I/O) subsystems 1228, serial port 1230, keyboard 1232, speaker 1234, microphone 1236, any other Communications including short-range communications subsystem generally designated as 1240 and any other device subsystems generally designated as 1242.

Some of the subsystems shown in FIG. 12 perform communication-related functions, whereas other subsystems may provide "resident" or on-device functions. Notably, some subsystems, such as keyboard 1232 and display 1222, for example, may be used for both communication-related functions, such as entering a text message for transmission over a communication network, and device-resident functions such as a calculator or task list.

Operating system software used by the microprocessor 1238 may be stored in a persistent store such as flash memory 1224, which may instead be a read-only memory (ROM) or similar storage element (not shown). Those skilled in the art will appreciate that the operating system, specific device applications, or parts thereof, may be temporarily loaded into a volatile memory such as RAM 1226. Received communication signals may also be stored in RAM 1226. Further, a unique identifier is also preferably stored in read-only memory.

As shown, flash memory 1224 can be segregated into different areas for both computer programs 1258 and program data storage 1250, 1252, 1254 and 1256. These different storage types indicate that each program can allocate a portion of flash memory 1224 for their own data storage requirements. Microprocessor 1238, in addition to its operating system functions, may enable execution of software applications on the UE. A predetermined set of applications that control basic operations, including data and voice communication applications for example, may be installed on UE 1200 during manufacturing. One software application may be a personal information manager (PIM) application having the ability to organize and manage data items relating to the user of the UE such as, but not limited to, e-mail, calendar events, voice mails, appointments, and task items. Other applications may include multimedia application, social networking applications, instant messaging application, among others.

In a data communication mode, a received signal such as a text message or web page download may be processed by the communication subsystem 1211 and input to the microprocessor 1238, which may further process the received signal for output to the display 1222, or alternatively to an auxiliary I/O device 1228. A user of UE 1200 may also compose data items such as email messages for example, using the keyboard 1232, which in one embodiment is a complete alphanumeric keyboard or telephone-type keypad, in conjunction with the display 1222 and possibly an auxiliary I/O device 1228. Such composed items may then be transmitted over a communication network through the communication subsystem 1211.

For voice communications, overall operation of UE 1200 is similar, except that received signals would typically be output to a speaker 1234 and signals for transmission would be generated by a microphone 1236. Alternative voice or audio I/O subsystems, such as a voice message recording subsystem, may also be implemented on UE 1200. Although voice or audio signal output is generally accomplished primarily through the speaker 1234, display 1222 may also be used to provide an indication of the identity of a calling party, the duration of a voice call, or other voice call related information for example.

Serial port 1230 in FIG. 12 would normally be implemented in a personal digital assistant (PDA)-type UE for which synchronization with a user's desktop computer (not shown) may be desirable. Such a port 1230 would enable a user to set preferences through an external device or software application and would extend the capabilities of UE 1200 by providing for information or software downloads to UE 1200 other than through a wireless communication network. The alternate download path may for example be used to load an encryption key onto the device through a direct and thus reliable and trusted connection to thereby enable secure device communication.

Alternatively, serial port 1230 could be used for other communications, and could include as a universal serial bus (USB) port. An interface is associated with serial port 1230.

Other communications subsystems 1240, such as a short-range communications subsystem, is a further optional component which may provide for communication between UE 1200 and different systems or devices, which need not necessarily be similar devices. For example, the subsystem 1240 may include an infrared device and associated circuits and components or a Bluetooth™ communication module to provide for communication with similarly enabled systems and devices.

Reference is now made to FIG. 13. FIG. 13 is a block diagram of a communication system 1300 which includes a UE 1302 which communicates through a wireless communication network.

UE 1302 communicates wirelessly with one of multiple access points such as Node Bs 1306 in UTRAN 1320. Each Node B 1306 is responsible for air interface processing and some radio resource management functions. Node B 1306 provides functionality similar to a Base Transceiver Station in a GSM/GPRS networks.

The wireless link shown in communication system 1300 of FIG. 13 represents one or more different channels, typically different radio frequency (RF) channels, and associated protocols used between the wireless network and UE 1302. A Uu air interface 1304 is used between UE 1302 and Node B 1306.

An RF channel is a limited resource that must be conserved, typically due to limits in overall bandwidth and a limited battery power of UE 1302. Those skilled in art will appreciate that a wireless network in actual practice may include hundreds of cells depending upon desired overall expanse of network coverage. All pertinent network components may be connected by multiple switches and routers (not shown), controlled by multiple network controllers.

Each Node B 1306 communicates with a radio network controller (RNC) 1310. The RNC 1310 is responsible for control of the radio resources in its area. One RNC 1310 controls multiple Node Bs 1306.

The RNC 1310 in UMTS networks provides functions equivalent to the Base Station Controller (BSC) functions in GSM/CPRS networks. However, an RNC 1310 includes more intelligence including, for example, autonomous handovers management without involving MSCs and SGSNs.

The interface used between Node B 1306 and RNC 1310 is an Iub interface 1308. An NBAP (Node B application part) signaling protocol is primarily used, as defined in 3GPP TS 25.433 V3.11.0 (2002-09) and 3GPP TS 25.433 V5.7.0 (2004-01).

Universal Terrestrial Radio Access Network (UTRAN) 1320 comprises the RNC 1310, Node B 1306, the Uu air interface 1304, and Iub interface 1308.

Circuit switched traffic is routed to Mobile Switching Centre (MSC) 1330. MSC 1330 is the computer that places the calls, and takes and receives data from the subscriber or from PSTN (not shown).

Traffic between RNC 1310 and MSC 1330 uses the Iu-CS interface 1328. Iu-CS interface 1328 is the circuit-switched connection for carrying (typically) voice traffic and signaling between UTRAN 1320 and the core voice network. The main signaling protocol used is RANAP (Radio Access Network Application Part). The RANAP protocol is used in UMTS signaling between the Core Network 1321, which can be a MSC 1330 or SGSN 1350 (defined in more detail below) and UTRAN 1320. RANAP protocol is defined in 3GPP TS 25.413 V3.11.1 (2002-09) and TS 25.413 V5.7.0 (2004-01).

For all UEs 1302 registered with a network operator, permanent data (such as UE 1302 user's profile) as well as temporary data (such as UE 1302 current location) are stored in a home location registry (HLR) 1338. In case of a voice call to UE 1302, HLR 1338 is queried to determine the current location of UE 1302. A Visitor Location Register (VLR) 1336 of MSC 1330 is responsible for a group of location areas and stores the data of those mobile stations that are currently in its area of responsibility. This includes parts of the permanent mobile station data that have been transmitted from HLR 1338 to the VLR 1336 for faster access. However, the VLR 1336 of MSC 1330 may also assign and store local data, such as temporary identifications. UE 1302 is also authenticated on system access by HLR 1338.

Packet data is routed through Service GPRS Support Node (SGSN) 1350. SGSN 1350 is the gateway between the RNC and the core network in a GPRS/UMTS network and is responsible for the delivery of data packets from and to the UEs within its geographical service area. Iu-PS interface 1348 is used between the RNC 1310 and SGSN 1350, and is the packet-switched connection for carrying (typically) data traffic and signaling between the UTRAN 1320 and the core data network. The main signaling protocol used is RANAP (described above).

The SGSN 1350 communicates with the Gateway GPRS Support Node (GGSN) 1360. GGSN 1360 provides the interface between the UMTS/GPRS network and other networks such as the Internet or private networks. GGSN 1360 is connected to a public data network PDN 1370 over a Gi interface.

Those skilled in art will appreciate that wireless network may be connected to other systems, possibly including other networks, not explicitly shown in FIG. 13. A network will normally be transmitting at very least some sort of paging and system information on an ongoing basis, even if there is no actual packet data exchanged. Although the network consists of many parts, these parts all work together to result in certain behaviours at the wireless link.

While the present disclosure discusses UMTS and other 3G systems, this is not meant to be limiting. The present disclosure could be applicable to fourth generation (4G) systems such as Long Term Evolution (LTE).

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method at a user equipment for establishing a circuit switched call, the user equipment being in a Cell Forward Access CHannel (CELL_FACH) state, a Cell Paging CHannel (CELL_PCH) state or a UTRAN Registration Area Paging CHannel (URA_PCH) state, the method comprising:
   receiving an indication from a network element that a circuit switched call is pending;
   determining that the network element does not support fast transition;
   in response to the indication and to the determination that the network element does not support fast transition, tearing down a radio resource control (RRC) connection;
   sending to the network element a radio resource control connection request (RRCConnectionRequest) message to cause the user equipment to transition to a Cell Dedicated CHannel (CELL_DCH) state, the message including an indication that the circuit switched call is pending;
   receiving a confirmation that the user equipment is transitioned to the CELL_DCH state; and
   in response to receiving the confirmation, establishing the circuit switched call.

2. The method of claim 1, wherein if the network element supports fast transition, the method further comprising storing information that the network element supports fast transition.

3. The method of claim 2, wherein the stored information is set based on a learning phase on the user equipment.

4. The method of claim 2, wherein the stored information is reset upon radio-reactivation or network change.

5. The method of claim 1, wherein the sending comprises checking whether the network element causes the user equipment to transition to a CELL_DCH state and, if yes, sending a cell update rather than the RRCConnectionRequest message.

6. The method of claim 2, wherein the stored information is reset upon radio re-activation or network change.

7. A user equipment configured for establishing a circuit switched call, the user equipment being in a Cell Forward Access CHannel (CELL_FACH) state, Cell Paging CHannel (CELL_PCH) state or a UTRAN Registration Area Paging CHannel (URA_PCH) state, the user equipment comprising:
    a processor; and
    a communications subsystem,
wherein the processor and communications subsystem cooperate to:
    receive an indication from a network element that a circuit switched call is pending;
    determine that the network element does not support fast transition;
    in response to the indication and to the determination that the network element does not support fast transition,
        tear down a radio resource control (RRC) connection;
        send to the network element a radio resource control connection request (RRCConnectionRequest) message to cause the user equipment to transition to a CELL_DCH state, the message including an indication that the circuit switched call is pending;
        receive a confirmation that the user equipment is transitioned to the CELL_DCH state; and
        in response to receiving the confirmation, establish the circuit switched call.

8. The user equipment of claim 7, wherein if the network element supports fast transition, the processor and communications subsystem further cooperate to store information that the network element supports fast transition.

9. The user equipment of claim 8, wherein the stored information is set based on a learning phase on the user equipment.

10. The user equipment of claim 8, wherein the stored information is reset upon radio-reactivation or network change.

11. The user equipment of claim 7, wherein the sending comprises checking whether the network element causes the user equipment to transition to a CELL_DCH state and, if yes, sending a cell update rather than the RRCConnectionRequest message.

12. A non-transitory computer readable medium having stored thereon executable code for execution by a processor of a user equipment, the executable code including instructions for:
    receiving an indication from a network element that a circuit switched call is pending;
    determining that the network element does not support fast transition;
    in response to the indication and to the determination that the network element does not sunoort fast transition,
        tearing down a radio resource control (RRC) connection;
        sending to the network element a radio resource control connection request (RRCConnectionRequest) message to cause the user equipment to transition to a Cell Dedicated CHannel (CELL_DCH) state, the message including an indication that the circuit switched call is pending;
        receiving a confirmation that the user equipment is transitioned to the CELL_DCH state; and
        in response to receiving the confirmation, establishing the circuit switched call.

* * * * *